United States Patent [19]

Martin et al.

[11] 4,406,818

[45] Sep. 27, 1983

[54] OLEFIN POLYMERIZATION

[75] Inventors: Joel L. Martin; M. Bruce Welch, both of Bartlesville, Okla.; Richard E. Dietz, Borger, Tex.; Charles E. Capshew, Bartlesville, Okla.

[73] Assignee: Phillips Petroleum Company, Bartlesville, Okla.

[21] Appl. No.: 343,643

[22] Filed: Jan. 28, 1982

[51] Int. Cl.$^3$ .............................................. B01J 31/26
[52] U.S. Cl. ................................................. 252/429 B
[58] Field of Search ........................ 252/429 B, 429 C

[56] References Cited

U.S. PATENT DOCUMENTS

| | | | |
|---|---|---|---|
| 3,094,568 | 6/1963 | Hay et al. | 252/429 B X |
| 3,412,174 | 11/1968 | Kroll | 252/429 B X |
| 3,654,249 | 4/1972 | Diedrich et al. | 252/429 C X |
| 3,676,418 | 7/1972 | Tashiro et al. | 252/429 B X |
| 3,718,636 | 2/1973 | Stevens et al. | 252/429 C X |
| 3,833,515 | 9/1974 | Amtmann et al. | 252/429 C X |
| 3,875,076 | 4/1975 | Durand et al. | 252/429 B |
| 3,917,575 | 11/1975 | Matsuura et al. | 252/429 B X |
| 4,105,846 | 8/1978 | Hoff et al. | 526/124 |
| 4,113,654 | 9/1978 | Mayr et al. | 252/429 C |
| 4,172,050 | 10/1979 | Gessell | 252/429 C X |
| 4,190,555 | 2/1980 | Takamura et al. | 252/429 B |
| 4,268,418 | 5/1981 | Hoff | 252/429 B |
| 4,312,783 | 1/1982 | Sakurai et al. | 252/429 B |

FOREIGN PATENT DOCUMENTS 2517567  10/1975  Fed. Rep. of Germany.

Primary Examiner—Patrick Garvin

[57] ABSTRACT

Catalysts effective for the polymerization of olefins at high productivity formed upon mixing (1) a solution of titanium tetrahydrocarbyloxide or a zirconium tetrahydrocarbyloxide and an organoaluminum halide with (2) a dihydrocarbylmagnesium compound alone or admixed with a minor amount of a trialkylaluminum and (3) combining the product obtained in (2) with a metal halide selected from a silicon tetrahalide and a titanium tetrahalide. The catalyst component thus produced can be combined with an organoaluminum compound as a cocatalyst component.

13 Claims, No Drawings

OLEFIN POLYMERIZATION

BACKGROUND OF THE INVENTION

The invention relates to a composition of matter, a method of preparing same, catalyst, a method of producing a catalyst and a process of using the catalyst. In another aspect, this invention relates to a particularly effective ethylene polymerization catalyst and process.

In the production of polyolefins such as, for example, polyethylene, polypropylene, ethylene-butene copolymers, etc., an important aspect of the various processes and catalysts used to produce such polymers is the productivity. By productivity is meant the amount or yield of solid polymer that is obtained by employing a given quantity of catalyst. If the productivity is high enough, then the amount of catalyst residues contained in the polymer is low enough that the presence of the catalyst residues does not significantly affect the properties of the polymer and the polymer either does not require additional processing or less processing is needed to remove the catalyst residues. As those skilled in the art are aware, removal of catalyst residues from polymer is an expensive process and it is very desirable to employ a catalyst which provides sufficient productivity so that catalyst residue removal is not necessary or at least substantially reduced.

In addition, high productivities are desirable in order to minimize catalyst costs. Therefore, it is desirable to develop new and improved catalysts and polymerization processes which provide improved polymer productivities.

Accordingly, the object of the invention is to provide a catalyst.

Another object of the invention is to provide a polymerization process for using a catalyst capable of providing improved polymer productivities as compared to prior art catalysts.

Other objects, aspects, and the several advantages of this invention will be apparent to those skilled in the art upon a study of this disclosure and the appended claims.

SUMMARY OF THE INVENTION

In accordance with the invention, an active catalyst effective for the polymerization of olefin monomers at high productivity is formed upon mixing (1) a solution of a titanium tetrahydrocarbyloxide or a zirconium tetrahydrocarbyloxide and an organoaluminum halide with (2) a dihydrocarbylmagnesium compound, alone or admixed with a minor amount of a trialkylaluminum, and (3) combining the product obtained in (2) with a metal halide selected from among a silicon tetrahalide and a titanium tetrahalide.

In accordance with one embodiment, a polymerization catalyst is prepared by (1) forming a solution of an alkyl aluminum chloride and a titanium alkoxide or a zirconium alkoxide, (2) treating (1) with a dialkylmagnesium compound alone or admixed with a minor amount of a trialkylaluminum compound, and (3) treating (2) with titanium tetrachloride or silicon tetrachloride. The catalyst (3) is used with aluminum alkyls to polymerize ethylene.

Further, in accordance with the invention, a method for producing the above compositions is provided.

Further, in accordance with the invention, a catalyst is provided which forms on mixing the above composition of matter and an organoaluminum compound as a co-catalyst component.

Further, in accordance with the invention, aliphatic monoolefins are homopolymerized or copolymerized with other 1-olefins, conjugated diolefins, monovinylaromatic compounds and the like under polymerization conditions employing the catalysts described above.

Further, in accordance with the invention, the above-described catalyst is prepared by mixing together a titanium tetrahydrocarbyloxide compound or a zirconium tetrahydrocarbyloxide compound and an organoaluminum halide compound in a suitable solvent to produce a first catalyst component solution; a second catalyst component comprising a dihydrocarbylmagnesium compound is added under suitable conditions to the above-described first catalyst component solution in a manner so as to avoid a significant temperature rise in the solution to produce a solid composition in a form of a slurry with the solvent; the composition thus formed is then treated with a silicon tetrahalide or titanium tetrahalide; and excess titanium or silicon tetrahalide compound is removed from the resulting composition, for example, washed with a hydrocarbon compound and dried to form an active catalyst component which can then be combined with a co-catalyst component comprising an organoaluminum compound.

DETAILED DESCRIPTION OF THE INVENTION

Suitable titanium tetrahydrocarbyloxide compounds employed in step (1) include those expressed by the general formula

$$Ti(OR)_4$$

wherein each R is a hydrocarbyl radical individually selected from an alkyl, cycloalkyl, aryl, alkaryl, and aralkyl hydrocarbon radical containing from about 1 to about 20 carbon atoms per radical and each R can be the same or different. Titanium tetrahydrocarbyloxides in which the hydrocarbyl group contains from about 1 to about 10 carbon atoms per radical are most often employed because they are more readily available. Suitable titanium tetrahydrocarbyloxides include, for example, titanium tetramethoxide, titanium tetraethoxide, titanium tetra-n-butoxide, titanium tetrahexyloxide, titanium tetradecyloxide, titanium tetraeicosyloxide, titanium tetracyclohexyloxide, titanium tetrabenzyloxide, titanium tetra-p-tolyloxide, titanium tetraisopropoxide and titanium tetraphenoxide and mixtures thereof. Titanium tetraethoxide or titanium tetraisopropoxide is presently preferred because of especial efficacy in the process.

Catalysts derived from titanium tetraethoxide are very active and yield polymer at high productivity rates having a narrow molecular weight distribution. Catalysts derived from titanium tetraiisopropoxide are less active but produce polymers exhibiting a broad molecular weight distribution.

Suitable zirconium tetrahydrocarbyloxide compounds include those represented by the formula

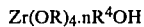

$$Zr(OR)_4 \cdot nR^4OH$$

wherein R is as defined before, n is in the range of 0 to 2 and $R^4OH$ represents an alcohol, preferably an alkanol having 1–10 carbon atoms. Generally, the radicals R and $R^4$ are the same in the alcohol solvated tetrahydrocarbyloxides. Examples of suitable zirconium compounds are zirconium tetramethoxide, zirconium tetraethoxide, zirconium tetraisopropoxide isopropanol 1:1 molar complex, zirconium tetradecyloxide, zirconium tetraeicosyloxide, zirconium tetracyclohexyloxide, zirconium tetrabenzyloxide, zirconium tetra-p-tolyloxide and zirconium tetraphenoxide and mixtures thereof.

The titanium alkoxide can be employed in a form complexed with an alcohol, i.e., in the form $Ti(OR)_4 \cdot n\text{-}R^4OH$, wherein $R^4OH$ again is an alcohol, preferably an alkanol with 1–10 carbon atoms.

$Ti(OR)_4$ and $Zr(OR)_4$ alkoxides can be made by reacting the corresponding tetrachloride, e.g., $TiCl_4$, with an alcohol, e.g., an alkanol having 1–10 carbon atoms, in the presence of a HCl acceptor such as $NH_3$ as shown below; e.g.:

$$TiCl_4 + 4EtOH + 4NH_3 \rightarrow Ti(OEt)_4 + 4NH_4Cl$$

$$ZrCl_4 + 4BuOH + 4NH_3 \rightarrow Zr(OBu)_4 + 4NH_4Cl$$

$$(Et = -C_2H_5, Bu = -n-C_4H_9)$$

If an excess of the alcohol is present, then the product alkoxide can be solvated with the alcohol. The alcohol is easier to remove from the solvated $Ti(OR)_4$ than the solvated $Zr(OR)_4$. Thus, in complexes containing alcohols, it is desirable or essential that the alcohol complexed is the same used in preparing the alkoxide as shown above.

The lower Ti alkoxides such as titanium tetraisopropoxide, $Ti(O\text{-}i\text{-}C_3H_7)_4$, can react with a higher alcohol to form the corresponding alkoxide, e.g., $Ti(O\text{-}i C_3H_7)_4 + 4BuOH \rightarrow Ti(OBu_4 + 4i\text{-}C_3H_7OH$. If the zirconium alkoxides react similarly, then the alcohol solvated complexes must be tied to the alcohol used in their preparation as shown in the two equations above.

Mixtures of the hydrocarbyloxides of titanium and zirconium can also be employed. However, no advantage in productivity appears to be gained from doing this. It is presently preferred to use either the titanium or the zirconium compound alone in preparing the catalyst and most preferably a titanium compound because of its cheaper cost and efficacy in the catalyst system.

A second catalyst component used in step (1) is generally an organoaluminum halide compound which includes, for example, dihydrocarbylaluminum monohalides of the formula $R_2AlX$, monohydroxycarbylaluminum dihalides of the formula $RAlX_2$, and hydrocarbylaluminum sesquihalides of the formula $R_3Al_2X_3$ wherein each R in the above formulas is as defined before and each X is a halogen atom and can be the same or different. Some suitable organoaluminum halide compounds include, for example, methylaluminum dibromide, ethylaluminum dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and the like. Polyhalided compounds are preferred.

The molar ratio of the titanium tetrahydrocarbyloxide compound or zirconium tetrahydrocarbyloxide compound to the organoaluminum halide compound can be selected over a relatively broad range. Generally, the molar ratio is within the range of about 1:5 to about 5:1. The preferred molar ratios are within the range of about 1:2 to about 2:1.

A titanium tetrahydrocarbyloxide compound or zirconium tetrahydrocarbyloxide compound and organoaluminum halide compound are normally mixed together in a suitable solvent or diluent which is essentially inert to these compounds and the product produced. By the term "inert" is meant that the solvent does not chemically react with the dissolved components such as to interfere with the formation of the product or the stability of the product once it is formed. Such solvents or diluents include hydrocarbons, for example, paraffinic hydrocarbons such as n-pentane, h-hexane, n-heptane, cyclohexane, and the like and monocyclic and alkyl-substituted monocyclic aromatic hydrocarbons such as benzene, toluene, the xylenes, and the like. Polymers produced with catalysts prepared from an aromatic solvent and titanium tetraiisopropoxide show broader molecular weight distributions, based on higher HLMI/MI values, than polymers made with an aromatic solvent-titanium tetraiisopropoxide-titanium tetraethoxide system. The tetraiisopropoxide is more soluble in an aromatic solvent than a paraffin, hence such a solvent is preferred in producing that invention catalyst. The nature of the solvent employed is, therefore, related to the type of metal hydrocarbyloxide employed. Generally, the amount of solvent or diluent employed can be selected over a broad range. Usually the amount of solvent or diluent is within the range of about 10 to about 30 g per gram of titanium tetrahydrocarbyloxide.

The temperature employed during the formation of the solution of the two components of step (1) can be selected over a broad range. Normally a temperature within the range of about 0° C. to about 100° C. is used when solution is formed at atmospheric pressure. Obviously, temperatures employed can be higher if the pressure employed is above atmospheric pressure. The pressure employed during the solution-forming step is not a significant parameter. At atmospheric pressure good results are obtained from about 20°–30° C. and are presently preferred.

The solution of titanium compound or zirconium compound and organoaluminum halide compound formed in step (1) is then contacted with a dihydrocarbylmagnesium compound alone or admixed with a minor amount of a trialkylaluminum. The organomagnesium compound can be expressed as $MgR''_2$ in which $R''$ can be the same or different and each is a hydrocarbyl group such as alkyl, cycloalkyl, aryl, aralkyl, and alkaryl containing from one to about 12 carbon atoms wherein presently preferred compounds are dialkylmagnesium compounds in which alkyl group contains from 1 to about 6 carbon atoms. Specific examples of suitable compounds include dimethylmagnesium, diethylmagnesium, and n-butyl-sec-butylmagnesium, di-n-pentylmagnesium, didodecylmagnesium, diphenylmagnesium, dibenzylmagnesium, dicyclohexylmagnesium and the like and mixtures thereof.

The molar ratio of tetravalent titanium compound employed in step (1) to organomagnesium compound used in step (2) can range from about 5:1 to about 1:2, preferably, from about 3:1 to about 1:1.

The trialkylaluminum compound can be expressed as $AlR'_3$ in which $R'$ is an alkyl group containing from one to about 12 carbon atoms. Specific examples of suitable compounds include trimethylaluminum, triethylaluminum, tri-n-butylaluminum, tridodecylaluminum, and the like and mixtures thereof. By a minor amount in association with the dihydrocarbylmagnesium compound is meant from about 1 to about 25 mole percent trialkylaluminum.

The product formed after addition of organomagnesium compound in step (2) is treated with a metal halide selected from silicon tetrahalide or titanium tetrahalide, preferably, titanium tetrachloride.

In step (3) the molar ratio of titanium tetrahalide to the combined moles of components of step (2) products can range from about 10:1 to about 0.5:1, preferably, from about 2:1 to about 1:1.

After addition of titanium tetrahalide to the other catalyst components the product formed can be recovered by filtration, decantation, and the like. The product is preferably washed with a suitable material such as a hydrocarbon, for example, n-pentane, n-heptane, cyclohexane, benzene, xylenes, and the like to remove soluble material and excess titanium compound which may be present. Product can then be dried and stored under any inert atmosphere. The products formed in this manner can be designated as catalyst A which can subsequently be combined with a co-catalyst B.

Co-catalyst component B is a metallic hydride or organometallic compound wherein said metal is selected from Periodic Groups IA, IIA, IIIA of the Mendeleev Periodic Table. The preferred compound to be used as component B is an organoaluminum compound which can be represented by the formula $AlY_bR'''_{3-b}$ in which $R'''$ is the same or different and is a hydrocarbon radical selected from such groups as alkyl, cycloalkyl, aryl, alkaryl, aralkyl, alkenyl and the like having from 1 to about 12 carbon atoms per molecule, Y is a monovalent radical selected from among the halogens and hydrogen, and b is an integer of 0 to 3. Specific examples of organoaluminum compounds include trimethylaluminum, triethylaluminum, triisobutylaluminum, tridodecylaluminum, tricyclohexylaluminum, triphenylaluminum, tribenzylaluminum, triisopropenylaluminum, diethylaluminum chloride, diisobutylaluminum hydride, ethylaluminum dibromide, and the like.

The amount of cocatalyst (component B) employed with the catalyst (component A) during polymerization can vary rather widely from about 0.02 mmole per liter reactor contents to about 10 mmole per liter reactor contents. However, particularly good results are obtained at a more preferred range of about 0.07 mmole per liter reactor contents to about 2.5 mmole per liter reactor contents.

The polymerization process can be effected in a batchwise or in a continuous fashion by employing any conventional mode of contact between the catalyst system and the monomer or monomers. Thus the monomer can be polymerized by contact with the catalyst system in solution, in suspension, or in gaseous phase at temperatures ranging from about 20°–200° C. and pressures ranging from about atmospheric to about 1,000 psia (6.9 MPa). The polymerization process can be conducted batchwise such as in a stirred reactor or continuously such as in a loop reactor under turbulent flow conditions sufficient to maintain the catalyst in suspension. A variety of polymerizable compounds are suitable for use in the process of the present invention. Olefins which can be polymerized or copolymerized with the invention catalyst include aliphatic mono-1-olefins. While the invention would appear to be suitable for use with any aliphatic monoolefin, olefins having 2 to 8 carbon atoms are most often used and ethylene is particularly preferred.

The ethylene polymers produced are normally solid ethylene homopolymers or polymers prepared by copolymerizing ethylene alone or in combination with at least one aliphatic 1-olefin containing from 3 to about 10 carbon atoms or a conjugated acyclic diolefin containing 4 or 5 carbon atoms. In such polymers, the ethylene can range from about 80 to 100 mole percent. The polymers can be converted into various useful items including films, fibers, pipe, containers, and the like by employing conventional plastics fabrication equipment.

It is especially convenient when producing ethylene polymers to conduct the polymerization in the presence of a dry hydrocarbon diluent inert in the process such as isobutane, n-heptane, methylcyclohexane, benzene, and the like at a reactor temperature ranging from about 60° C. to about 110° C. and a reactor pressure ranging from about 250 to about 600 psia (1.7–4.1 MPa). In such a process, particle form polymerization, the polymer is produced as discrete solid particles suspended in the reaction medium. The polymer can be recovered, can be treated to deactivate and/or remove catalyst residues, can be stabilized with an antioxidant system, and can be dried, all as known in the art to obtain the final product. Also, molecular weight controls such as hydrogen can be employed in the reactor as is known in the art to adjust the molecular weight of the product, if desired.

EXAMPLE I

Catalyst Preparation

Generally, each catalyst was prepared by charging to a stirred 500 mL round bottom flask equipped for refluxing, when used, about 300 mL of n-hexane, 0.035 mole of titanium tetraethoxide [Ti(OEt)$_4$] or titanium tetraisopropoxide [Ti(O-i-Pr)$_4$] and 0.035 mole of ethylaluminum dichloride (EADC) as a 25 wt. % solution in n-heptane, all at room temperature (23° C.). The solution was stirred and then to it was added 0.019 mole of n-butyl-sec-butylmagnesium (MgBu$_2$) as a 0.637 molar solution in n-heptane over about a 20 minute period resulting in the formation of a slurry. Titanium tetrachloride, 0.192 mole, the halide treating agent in this series, was added neat to the slurry and the mixture stirred for one hour at room temperature or refluxed at 68° C. for one hour as indicated. The catalyst was recovered by allowing the slurry to settle, decanting a mother liquor and washing the slurry twice with portions of n-hexane and twice with portions of n-pentane. The product was dried over a warm water bath and stored in an inert atmosphere in a dry box until ready for use.

EXAMPLE II

Ethylene polymerization was conducted for 1 hour at 80° C. in a 3.8 liter stirred, stainless steel reactor in the presence of isobutane diluent and 0.92 mole of triethylaluminum (TEA) as cocatalyst. Charge order was cocatalyst, catalyst and 2 liters diluent. Ethylene partial pressure was 0.69 MPa and total reactor pressure was 2.0 MPa. Ethylene was supplied on demand from a pressurized reservoir as required during each run. Polymerization was terminated by venting ethylene and diluent. The polymer was recovered, dried and weighed to determine yields. Catalyst productivity is calculated by dividing polymer weight in grams by catalyst weight in grams and is conveniently expressed as kg polymer per g catalyst per hour (kg/g/hr).

The titanium alkoxide used, halide treating temperature employed, mole ratios used and results obtained are given in Table 1.

EXAMPLE IV

Catalysts were prepared using the process employed for the standard catalyst except that in one instance ethylaluminum sesquichloride (EASC) was used in place of EADC and in the other instance diethylaluminum chloride (DEAC) was used in place of EADC.

TABLE 1

| Run No. | Ti(OR)$_4$ Used | Halide Treating Temp. °C. | Mole Ratios Ti(OR)$_4$/EADC | EADC/Mg Bu$_2$ | TiCl$_4$/Combined Organometal Cpds | Cat. Wt. mg | Polymer Wt. g | Calculated Productivity kg/g/hr |
|---|---|---|---|---|---|---|---|---|
| 1[a] | Ti(OEt)$_4$ | 68 | 1:1 | 1.8:1 | 2:1 | 0.4 | 120 | 300 |
| 2[a] | " | " | " | " | " | 0.8 | 158[b] | 198 |
| 3 | " | " | " | " | " | 2.7 | 434 | 161 |
| 4[a] | " | " | " | " | " | 0.6 | 101 | 168 |
| 5 | " | 23 | " | " | " | 1.4 | 283 | 202 |
| 6 | Ti(O—i-Pr)$_4$ | " | " | " | " | 6.4 | 44 | 6.8 |
| 7[c] | Ti(OEt)$_4$ | " | " | " | " | 1.2 | 253 | 211 |
| 8[d] | " | " | " | " | " | 1.7 | 302 | 178 | notes:
[a] Mixed organometal compounds at 0° C., warmed mixture to 23° C. and added TiCl$_4$.
[b] Repeated polymerization with a second portion of run 1 catalyst.
[c] Mixed organometal compounds at 23° C., allowed solids to settle washed them twice with n-hexane, added TiCl$_4$ to washed slurry.
[d] Mixed Ti(OR)$_4$ and EADC at 23° C. Heated to 68° C., added Mg Bu$_2$, then cooled to 23° C. and added TiCl$_4$.

The data show with Ti(OEt)$_4$-derived catalysts that variations in mixing conditions may alter catalyst activity somewhat but that generally considerable latitude in said conditions can be tolerated. Thus, calculated catalyst productivities of about 200 kg/g/hr in the absence of hydrogen at 80° C. is considered to be normal for the invention catalyst.

Poor results are noted with the Ti(O-i-Pr)$_4$-derived catalyst based on one test only and may represent an anomalous result.

Ethylene polymerization was conducted with a portion of each catalyst as before. The results are given in Table 2.

TABLE 2

| Run No. | Organoaluminum Halide | Mole Ratios Ti(OEt$_4$)/Organoaluminum Halide | Organoaluminum Halide/Mg Bu$_2$ | TiCl$_4$/Combined Org. Cpds. | Cat. Wt. mg | Polymer Wt. g | Calculated Productivity kg/g/hr |
|---|---|---|---|---|---|---|---|
| 1 | EASC | 1.8:1 | 1:1 | 2.5:1 | 1.2 | 209 | 174 |
| 2 | DEAC | 1.7:1 | 1.1:1 | 2.4:1 | 5.5 | 286 | 52 |

The results show that ethylaluminum sesquichloride is about equivalent to ethylaluminum dichloride in preparing the invention catalyst based on the calculated productivity but diethylaluminum chloride is not as efficient under these conditions as the polyhalide aluminum compounds. Thus, the DEAC-derived catalyst only exhibited about 0.3, the activity of the EASC-derived catalyst under the same polymerization conditions.

EXAMPLE III

Control

A catalyst was prepared in the manner employed for the "standard" catalyst of run 5 except that TiCl$_4$ was omitted from the recipe. Ethylene polymerization was conducted at conditions identical to those of Example II with a 3.2 mg portion of the catalyst. Only a polymer trace resulted. Thus, the presence of a halide treating agent as exemplified by TiCl$_4$ is shown to be essential in the catalyst preparation.

EXAMPLE V

A series of catalysts was prepared using the process employed for the standard catalyst except that the level of EADC was varied. Ethylene polymerization was conducted with a portion of each catalyst as before. The results are presented in Table 3.

TABLE 3

| Run No. | mmoles EADC | Mole Ratios Ti(OEt)$_4$/EADC | EADC/Mg BU$_2$ | TiCl$_4$/Combined Organic Cpds. | Cat. Wt. mg. | Polymer Wt. g | Calculated Productivity kg/g/hr |
|---|---|---|---|---|---|---|---|
| 1 | 0 | 0 | 0 | 3.4:1 | 1.6 | 140 | 87.5 |
| 2 | 0.017 | 2:1 | 1:1 | 2.6:1 | 4.1 | 318 | 77.6 |
| 3 | 0.027 | 1.3:1 | 1.4:1 | 2.2:1 | 2.8 | 210 | 75.0 |
| 4* | 0.035 | 1:1 | 1.8:1 | 2:1 | 1.4 | 283 | 202 |
| 5 | 0.042 | 0.83:1 | 2.2:1 | 1.9:1 | 5.1 | 655 | 128 |

*same as run 5, Table 1 (standard catalyst)

The results show that relatively active catalyst results even in the absence of EADC (run 1). Runs 2, 3 suggest that catalysts prepared with EADC levels below that of the standard catalyst of run 4 are about equivalent or slightly poorer in activity than a catalyst prepared in the absence of EADC. When the EADC level is increased to about 1¼ times that employed in preparing the standard catalyst of run 4 then a catalyst is made having about 0.63 times the activity of the standard but still about 1.5 times better than when no EADC is used.

EXAMPLE VI

A catalyst was prepared using the process employed for the standard catalyst except that 18 mL of commercial preparation (Magala$^R$), containing dibutylmagnesium (1.026 mg Mg/mL) and TEA (0.173 mmoles Al/mL) in hydrocarbon was employed in place of MgBu$_2$. Ethylene polymerization was conducted with a 2.0 mg portion of catalyst as before yielding 339 g polyethylene. A calculated catalyst productivity of 169 kg/g/hr resulted. Thus, an active catalyst is produced having about 0.84 times the activity of the standard catalyst. This indicates that about 15–20 mole percent of an organoaluminum compound can be substituted for the organomagnesium compound to yield compositions which can be employed in preparing active catalysts.

EXAMPLE VII

A catalyst was prepared using the process employed for the standard catalyst except that ½ the level of MgBu$_2$ was used (0.0095 mmoles vs 0.019 mmoles for the standard catalyst) and the halide treatment occurred at 68° C. Ethylene polymerization was conducted with a 2.2 mg portion of the catalyst as before yielding 138 g polyethylene giving a calculated catalyst productivity of 62.7 kg/g/hr. The calculated mole ratios are: Ti(OEt)$_4$:EADC=1:1, EADC/MgBu$_2$=3.7:1 and TiCl$_4$:combined organometal compounds=2.4:1. Thus, decreasing the level of MgBu$_2$ to ½ that normally used decreases catalyst activity to about 0.3 that of the standard catalyst.

EXAMPLE VIII

Several catalysts were prepared using the general process employed for the standard catalyst except that the halide agent employed was SiCl$_4$, 0.175 moles in one instance and 0.349 moles in the other, instead of the 0.182 moles of TiCl$_4$ used in the standard catalyst. Ethylene polymerization was conducted as before. The results are given in Table 4.

TABLE 4

| Run No. | Mole Ratios | | | Cat. Wt. mg. | Polymer Wt. g | Calculated Catalyst Productivity kg/g/hr |
|---|---|---|---|---|---|---|
| | Ti(OEt)$_4$/EADC | EADC/Mg Bu$_2$ | SiCl$_4$/Combined Org. Cpds. | | | |
| 1 | 1:1 | 1.8:1 | 2.0:1 | 1.2 | 44 | 36.7 |
| 2 | 1:1 | 1.8:1 | 3.9:1 | 2.2 | 150 | 68.2 |

The results indicate that catalysts prepared with SiCl$_4$ instead of TiCl$_4$ do not yield catalysts as active in ethylene polymerization. Compared to the results employed with the standard catalyst (run 5, Table 1), run 1 catalyst shows about 0.2 the activity of the standard catalyst and run 2 catalyst shows about 0.3 the activity of the standard catalyst.

In the following series, ethylene polymerization was conducted in the 3.8 liter reactor employing a reactor temperature of 100° C., an ethylene partial pressure of 1.38 MPa, a hydrogen partial pressure of 0.345 MPa (unless indicated otherwise), 0.92 mmole of TEA as cocatalyst as before (unless indicated otherwise) and 2 liters of isobutane diluent.

EXAMPLE IX

A standard catalyst was prepared as described in run 5, Table 1. A 7.0 mg portion of it was employed in ethylene polymerization with 0.345 MPa hydrogen partial pressure and 3.83 MPa total reactor pressure. A second 4.8 mg portion of the catalyst was employed in ethylene polymerization with 0.827 MPa hydrogen partial pressure and 4.38 MPa total reactor pressure.

A second catalyst was prepared in a variation of the standard catalyst as described in run 7, Table 1. A 7.6 mg portion of it was employed in ethylene polymerization with 0.414 MPa hydrogen partial pressure and 3.69 MPa total reactor pressure.

The results with melt index (MI), high load melt index (HLMI) and HLMI/MI ratios are given in Table 5.

TABLE 5

| Run No. | Calculated Catalyst Productivity kg/g/hr | TEA mmole | Polymer Properties | | | |
|---|---|---|---|---|---|---|
| | | | MI | HLMI | HLMI/MI | Bulk Density g/cc |
| 1 | 60.3 | 0.46 | 0.51 | 16.5 | 32 | not made |
| 2 | 51.5 | " | 11. | 273 | 25 | not made |
| 3 | 41.1 | 0.92 | 3.0 | 80.3 | 27 | 0.32 |

MI — ASTM D 1238-73, condition E; g/10 minutes, 2160 g total load
HLMI — ASTM D 1238-73, condition F; g/10 minutes, 21,600 g total load
HLMI/MI — A ratio which indicates the molecular weight distribution. The higher the ratio, the broader the molecular weight distribution and greater the shear response of the polymer.

The results show the invention catalyst to be responsive to hydrogen as the melt index values of the polymers show. The polymer bulk density shown in run 3 indicates that the polymer "fluff" (as made polymer) can be processed in conventional equipment and that commercially useful polymer can be made. The HLMI/MI ratios shown are considered to be normal for titanium-based catalysts and are relatively narrow molecular weight distribution polymers.

The effect of the hydrogen is to reduce catalyst productivity and decrease polymer molecular weight as the hydrogen concentration increases. These effects are normal for the titanium-based catalysts.

EXAMPLE X

Several catalysts were prepared in this series. One was made by mixing about 300 mL of n-hexane, 0.035 mole of Ti(OEt)$_4$ and 18 mL of Magala ® at about 23° C. as described in Example VI. To the stirred mixture was added 0.211 mole of VOCl$_3$ and the slurry stirred for 1 more hour at about 23° C. The catalyst was recovered as before. A 71.5 mg portion was used in ethylene polymerization (run 1, Table 6).

A portion of the catalyst used in run 1, Table 4 was employed as the second catalyst. A 15.7 mg portion of it was employed in ethylene polymerization (run 2, Table 6).

In each run, the hydrogen partial pressure was 0.414 MPa and 0.92 mmole TEA was used as cocatalyst. The results are shown in Table 6.

TABLE 6

| Run No. | Calculated Catalyst Productivity kg/g/hr | Polymer Property | | |
|---|---|---|---|---|
| | | MI | HLMI | HLMI/MI |
| 1 | 1.10 | 1.05 | 45 | 43 |
| 2 | 28.6 | 1.9 | 48 | 25 |

The results demonstrate in run 1 that $VOCl_3$ is not an effective substitute for $TiCl_4$ in preparing active catalysts in this invention as the low productivity value obtained clearly shows. On the other hand, in this instance, $SiCl_4$ is seen to give a moderately active catalyst.

EXAMPLE XI

Three catalysts were prepared in this series. In (1) about 300 mL of mixed xylenes (as commercially sold), 0.035 mole of Ti(O-i-Pr)$_4$ and 0.035 mole of EADC were mixed together at about 23° C. (room temperature). To the stirred mixture at room temperature was added 0.019 mole of MgBu$_2$ as before. Finally, 0.182 mole of TiCl$_4$ was added, the mixture was stirred and the catalyst was recovered as before. In (2), a mixture containing about 200 mL of mixed xylenes, 5 g (0.011 mole) of a 1:1 molar complex of Zr(O-i-Pr)$_4$.i-C$_3$H$_7$OH and 0.017 mole of EADC as before. Finally, 0.182 mole of TiCl$_4$ was added, the mixture was stirred and the catalyst was recovered as before. In (3) the same procedure was followed as in (2) except that 2.5 g (0.0064 mole) of the Zr(O-i-Pr)$_4$.i-C$_3$H$_7$OH complex and 0.0064 mole of Ti(O-i-Pr)$_4$ were employed in place of the complex.

Ethylene polymerization was conducted as before with a hydrogen partial pressure of 0.345 MPa and 0.46 mmole TEA as cocatalyst. A 32.8 mg portion of catalyst was used in run 1, 14.3 mg of catalyst 2 used in run 2 and 12.4 mg of catalyst 3 used in run 3.

The results are given in Table 7.

TABLE 7

| Run No. | Calculated Catalyst Productivity kg/g/hr | Polymer Productivity | | |
|---|---|---|---|---|
| | | MI | HLMI | HLMI/MI |
| 1 | 25.3 | 0.21 | 9.8 | 47 |
| 2 | 8.88 | 0.13 | 8.4 | 65 |

TABLE 7-continued

| Run No. | Calculated Catalyst Productivity kg/g/hr | Polymer Productivity | | |
|---|---|---|---|---|
| | | MI | HLMI | HLMI/MI |
| 3 | 11.9 | 0.31 | 15 | 48 |

The results in run 1 suggest that moderately active catalysts can be derived from Ti(O-i-Pr)$_4$ when the hydrocarbon reaction medium in catalyst preparation is xylene rather than n-hexane as employed for the otherwise identical catalyst of run 6, Table 1. In that run, a productivity of only about 7 kg/g/hr was obtained compared to about 200 kg/g/hr for the standard catalyst. In this series the Ti(O-i-Pr)$_4$-derived catalyst gave 25.3 kg/g/hr which can be compared with the results under identical conditions for the standard catalyst in run 1, Table 5 of 60.3 kg/g/hr.

The results in runs 2, 3 indicate that only fairly active catalysts can be derived from the zirconium alkoxide-isopropanol complex or the complex admixed with an equimolar amount of Ti(O-i-Pr)$_4$. However, in run 2 with the catalyst derived from the zirconium alkoxide-alkanol complex, the polymer produced therewith had a HLMI/MI value of 65, indicative of a polymer with a broad molecular weight distribution.

EXAMPLE XII

Two catalysts previously described, one in Example VI and the other of run 1, Table 7, renumbered 1 and 4, respectively in this series, and two new catalysts are employed in this series. Catalysts 2, 3 were prepared in the general manner described for catalyst 4 in which a mixed xylenes reaction medium is used.

Catalyst 2 was prepared by mixing about 250 mL of mixed xylenes, 0.023 mole of Ti(OEt)$_4$, 0.012 mole of Ti(O-i-Pr)$_4$, 0.035 mole of EADC, 0.019 mole of MgBu$_2$ and 0.182 mole of TiCl$_4$. Catalyst 3 was prepared by mixing about 250 mL of mixed xylenes, 0.012 mole of Ti(OEt)$_4$, 0.023 mole of Ti(O-i-Pr)$_4$, 0.019 mole of MgBu$_2$ and 0.182 mole of TiCl$_4$.

Ethylene polymerization was conducted as before with a portion of each catalyst for 1 hour at 100° C. and 1.38 MPa ethylene partial pressure in 2 liters of isobutane and the indicated hydrogen partial pressure. In one series, 0.5 mmole TEA was used as cocatalyst along with 0.34 MPa hydrogen partial pressure. In a second series, 0.4 mmole of triisobutylaluminum (TIBA) was used as cocatalyst along with 0.34 MPa hydrogen partial pressure. In a third series, DEAC of the indicated concentration, was used as cocatalyst along with 0.69 MPa hydrogen partial pressure. The results are given in Table 8.

TABLE 8

| | Titanium Alkoxide Source | | | |
|---|---|---|---|---|
| | Ti(OEt)$_4$ | ⅔ Ti(OEt)$_4$ ⅓ Ti(O—i-Pr)$_4$ | ⅓ Ti(OEt)$_4$ ⅔ Ti(O—i-Pr)$_4$ | Ti(O—i-Pr)$_4$ |
| Run No. | 1A | 1B | 1C | 1D |
| Cocatalyst (mmole) | TEA (0.46) | TEA (0.46) | TEA (0.46) | TEA (0.46) |
| Catalyst (mg) | 5.5 | 7.3 | 11.1 | 7.0 |
| Productivity (kg/g/hr) | 64.7 | 41.8 | 21.4 | 25.3 |
| MI | 1.2 | 0.53 | 2.2 | 0.21 |
| HLMI/MI | 30 | 29 | 34 | 47 |
| Run No. | 2A | 2B | 2C | 2D |
| Cocatalyst (mmole) | TIBA (0.4) | TIBA (0.4) | TIBA (0.4) | TIBA (0.4) |

TABLE 8-continued

| | Titanium Alkoxide Source | | | |
|---|---|---|---|---|
| | Ti(OEt)$_4$ | ½ Ti(OEt)$_4$ / ½ Ti(O—i-Pr)$_4$ | ⅓ Ti(OEt)$_4$ / ⅔ Ti(O—i-Pr)$_4$ | Ti(O—i-Pr)$_4$ |
| Catalyst (mg) | 4.3 | 7.3 | 10.5 | 6.5 |
| Productivity (kg/g/hr) | 67.9 | 47.1 | 71.6 | 34.6 |
| MI | 1.2 | 1.2 | 1.1 | 0.39 |
| HLMI/MI | 28 | 33 | 34 | 53 |
| Run No. | 3A | 3B | 3C | 3D |
| Cocatalyst (mmole) | DEAC (1.3) | DEAC (2.1) | DEAC (2.1) | DEAC (4.2) |
| Catalyst (mg) | 3.5 | 6.5 | 13.9 | 16.9 |
| Productivity (kg/g/hr) | 61.1 | 34.6 | 19.1 | 3.49 |
| MI | 0.21 | 0.47 | 0.59 | 0.98 |
| HLMI/MI | 29 | 38 | 54 | 95 |

The results show that the nature of the titanium alkoxide used in preparing the catalyst can profoundly affect the activity of the catalyst as well as the molecular weight distribution of the polymer made with the catalyst. Thus, titanium tetraiisopropoxide is favored in producing broad molecular weight distribution polymers and titanium tetraethoxide is preferred when high productivity and narrow molecular weight distribution polymers are described.

We claim:

1. An olefin polymerization catalyst formed by
   (1) preparing a hydrocarbon solution of a titanium tetrahydrocarbyloxide compound or a zirconium tetrahydrocarbyloxide compound and an organoaluminum halide compound;
   (2) contacting the solution formed in step (1) with an organomagnesium compound alone or admixed with a minor amount of a trialkylaluminum;
   (3) treating the product contained in step (2) with a metal halide selected from a silicon tetrahalide and titanium tetrahalide; and
   (4) combining the product obtained in step (3) with an organoaluminum compound to form an active polymerization catalyst.

2. A composition according to claim 1 wherein the titanium tetrahydrocarbyloxide is a titanium alkoxide in which the alkyl group of the alkoxide contains from 1 to 20 carbon atoms, the organoaluminum halide compound can be expressed as monohalides of the formula R$_2$AlX, dihalides of the formula RAlX$_2$, and sesquihalides of the formula R$_3$Al$_2$X$_3$ in which R is a hydrocarbyl group having from 1 to 20 carbon atoms, and each X is a halogen atom and can be the same or different, and the organomagnesium compound can be expressed as MgR"$_2$ in which R" is a hydrocarbyl group containing from 1 to 12 carbon atoms and trialkylaluminum, if present can be expressed as AlR'$_3$ in which R' is an alkyl group having 1 to 12 carbon atoms.

3. A composition according to claim 2 wherein (1) is a solution of titanium tetraethoxide and ethylaluminum dichloride; (2) is a solution of (1) which is contacted with n-butyl-sec-butylmagnesium; (3) the product of step (2) is treated with titanium tetrachloride, and the product of (3) is combined in (4) with diethylaluminum chloride, triisobutylaluminum or triethylaluminum.

4. A catalyst according to claim 1 wherein the molar ratio of titanium tetrahydrocarbyloxide or zirconium tetrahydrocarbyloxide compound to organoaluminum halide compound in step (1) ranges from 5:1 to 1:5; the molar ratio of tetravalent titanium compound in step (1) to organomagnesium compound in step (2) ranges from 5:1 to 1:2; and the molar ratio of titanium tetrahalide added in step (3) to the combined moles of components of step (2) ranges from about 10:1 to about 0.5:1.

5. A composition according to claim 1 wherein the zirconium tetrahydrocarbyloxide compound is represented by the formula $$Zr(OR)_4 \cdot nR^4OH$$

wherein R is an alkyl group having from 1 to 20 carbon atoms, n is in the range of 0 to 2, and R$^4$OH represents an alcohol having from 1 to 10 carbon atoms, the organoaluminum halide compound can be expressed as monohalides of the formula R$_2$AlX, dihalides of the formula RAlX$_2$, and sesquihalides of the formula R$_3$Al$_2$X$_3$ in which R is a hydrocarbyl group having from 1 to 20 carbon atoms, and each X is a halogen atom and can be the same or different, and the organomagnesium compound can be expressed as MgR"$_2$ in which R" is a hydrocarbyl group containing from 1 to 12 carbon atoms and trialkylaluminum, if present can be expressed as AlR'$_3$ in which R' is an alkyl group having 1 to 12 carbon atoms and the metal halide is titanium tetrachloride.

6. A composition according to claim 5 wherein said zirconium compound is a complex of Zr(O-i-Pr)$_4$·i-C$_3$H$_7$OH.

7. A catalyst according to claim 1 formed by
   (1) preparing a hydrocarbon solution of titanium tetra-ethoxide, titanium tetra-isopropoxide or a zirconium tetraisopropoxide-isopropanol complex and ethylaluminum dichloride, ethylaluminum sesquichloride or diethylaluminum chloride;
   (2) contacting the solution of (1) with dibutylmagnesium or dibutylmagnesium and a minor amount of triethylaluminum;
   (3) treating the product contained in step (2) with a silicon tetrahalide or a titanium tetrahalide; and
   (4) combining the product of (3) with triethylaluminum.

8. A catalyst according to claim 7 wherein (2) is formed by contacting (1) with a mixture of dibutylmagnesium and triethylaluminum containing about 1–25 mole percent triethylaluminum.

9. A method for preparing a catalyst comprising
   (1) admixing together a first catalyst component comprising a titanium tetrahydrocarbyloxide or zirconium tetrahydrocarbyloxide compound, an organoaluminum halide compound and a hydrocarbon to produce a first catalyst component solution;

(2) contacting the first catalyst component solution in (1) with an organomagnesium compound alone or in admixture with a minor amount of a trialkylaluminum compound;

(3) treating the product of step (2) with a metal halide selected from a silicon tetrahalide and titanium tetrahalide; and (4) combining the catalyst component formed in step (3) with a co-catalyst component B which is an organoaluminum compound.

10. A method according to claim 9 for forming a catalyst comprising (1) forming a paraffinic or aromatic hydrocarbon solution of an alkylaluminum monochloride, dichloride, or sesquichloride and a titanium tetra alkoxide or zirconium tetra alkoxide;

(2) treating (1) with a dialkylmagnesium compound alone or in admixture with a minor amount of trialkylaluminum compound;

(3) treating (2) with titanium tetrachloride or silicon tetrachloride;

(4) removing unreacted silicon or titanium tetrachloride from the product formed in (3); and (5) combining the product of (4) with a trialkylaluminum.

11. A method according to claim 10 comprising (1) preparing a n-hexane or mixed xylenes solution of titanium tetraethoxide, titanium tetraiospropoxide or a zirconium tetraisopropoxide-isopropanol complex, and ethylaluminum dichloride, ethylaluminum sesquichloride or diethylaluminum chloride;

(2) contacting the solution of (1) with dibutylmagnesium or dibutylmagnesium and a minor amount of triethylaluminum;

(3) treating the product of step (2) with titanium tetrachloride or silicon tetrachloride;

(4) removing unreacted titanium or silicon tetrachloride from the product formed in (3); and (5) combining the product of (4) with triethylaluminum.

12. A method according to claim 9 wherein the final product in (3) is washed with an inert solvent in step (4) to remove unreacted titanium or silicon tetrachloride prior to combining with component B in step (5).

13. A method according to claim 9 wherein the reactants are contacted at from 0° to 100° C.

* * * * *